UNITED STATES PATENT OFFICE.

JAMES C. ANDERSON, OF HIGHLAND PARK, ILLINOIS.

FIRE-BRICK AND MODE OF MAKING THE SAME.

SPECIFICATION forming part of Letters Patent No. 245,338, dated August 9, 1881.

Application filed July 2, 1881. (No specimens.)

*To all whom it may concern:*

Be it known that I, JAMES C. ANDERSON, a citizen of the United States, residing at Highland Park, in the county of Lake, in the State of Illinois, have invented a new and useful Improvement in Fire-Bricks and in the Process of Making the Same, of which the following is a specification.

This invention relates to the manufacture of fire-bricks and other fire-resisting articles; and it consists in reducing the fire-clay to a powder, and then pressing it to the desired shape under enormous pressure.

Fire-bricks as heretofore made have been made from clay mixed with water into a paste, the moisture in the clay being allowed to leave the clay by evaporation before the burning process begins, or is expelled therefrom by heat in burning, and this has had a tendency to leave the completed brick open and spongy; in fact it has heretofore been the aim of inventors in this art to make the linings of furnaces, or the fire-brick composing said linings, of a porous nature, under the impression that the air cells or passages prevented the action of the heat from destroying the bricks. I have, however, discovered that the cellular or spongy construction of the fire-bricks has a tendency to bring the fire into direct contact with each atom of the clay, and the bricks are thereby consumed more rapidly; and I have also found that the more solid and compact the brick be made the greater will be the resistance offered to the reducing and destructive action of the fire upon them.

In carrying out my invention I first reduce the fire-clay, in a dry state, to a fine powder, and render such powder homogeneous by thoroughly agitating and mixing it together in a suitable mechanism for that purpose, which mechanism I have made the subject-matter of a separate application, filed June 16, 1881. The powdered fire-clay is then pressed into the desired form under enormous pressure, so that a practically solid body of the non-conducting and heat-resisting clay is formed without pores and without the noticeable presence of water or moisture. After the bricks are pressed they are then burned in the same manner, except that suitable kilns must be provided for applying an intense heat in the burning, as I have found it exceedingly difficult to apply a sufficient degree of heat to penetrate and take these bricks out of the clay state.

The example above stated of the process of treatment and preparation of the fire-clay prior to the molding operation I find to give the best results and quality to the brick for resisting the action of the fire, as it is highly essential to the best results that the clay should be made dry and reduced to a fine powder, and that the powder be mixed thoroughly together, that the impurities contained between the strata of all clays may be broken up and disseminated throughout the entire mass, and that the strata themselves, which differ materially in their component parts in the same clays, should be well mixed and made homogeneous; but I do not confine my invention strictly to such methods, as partial results may be obtained by crushing the clay only and molding it by pressure in its natural state without adding more water than is found in the clay in its natural state. It is sufficient for the purposes of my invention, therefore, that the clay be taken in the condition in which it is dug from the mine and pressed into form in that state without adding more water thereto.

By my method I am able to make fire-brick which will stand the highest fire-test from the common grades of fire-clays. These lower grades of fire-clay are readily accessible and abundant in a large part of the country, while the higher grades are not so accessible, and require to be transported long distances and at great expense.

The bricks made by my process are of such a solid and compact nature that they will be found of great value also in the smelting or refining of the precious ores, for the reason that they will not absorb such metals and necessitate the breaking up and melting of the brick to recover the absorbed metals, as is now the case where the ordinary fire-bricks are used.

Having thus described my invention, what I claim, and desire to secure by Letters Patent, is—

1. In the manufacture of fire-brick and other fire-resisting articles from fire-clay, the process herein described of reducing said clay while practically dry to a powdered state, and forming fire-bricks or other articles from said pulverized clay while in a practically dry state under great pressure, as set forth.

2. In the manufacture of fire-brick or other fire-resisting articles from fire-clay, the process of molding said fire-clay into form by great pressure in its natural state without mixing with water, as set forth.

3. As a new article of manufacture, a fire-brick or other fire-resisting article made from dry or partially-dry fire-clay under pressure, and having the characteristics herein described, viz., a non-porous and practically solid article, as set forth.

J. C. ANDERSON.

Attest:
W. S. MILLER,
R. W. MILLER.